United States Patent
Okudaira 4,074,931
Feb. 21, 1978

[54] VARIABLE FOCAL LENGTH LENS SYSTEM

[75] Inventor: Sadao Okudaira, Ranzan, Japan

[73] Assignee: Asahi Kogaku Kogyo Kabushiki Kaisha, Tokyo, Japan

[21] Appl. No.: 649,383

[22] Filed: Jan. 15, 1976

[30] Foreign Application Priority Data

Jan. 18, 1975 Japan ..................................... 50-8264

[51] Int. Cl.² .............................................. G02B 15/14
[52] U.S. Cl. ..................................... 350/184; 350/214
[58] Field of Search ................................. 350/184, 214

[56] References Cited

U.S. PATENT DOCUMENTS 3,848,969  11/1974  Tajima ................................. 350/184

Primary Examiner—Conrad J. Clark
Attorney, Agent, or Firm—Sughrue, Rothwell, Mion, Zinn and Macpeak

[57] ABSTRACT

A variable focal length lens system is disclosed having wide angle capability and a small size. The system has seven lenses divided in two groups. The first group consists of three of the lenses and is movable relative to the second group, which consists of the remaining four lens.

3 Claims, 4 Drawing Figures

VARIABLE FOCAL LENGTH LENS SYSTEM

BACKGROUND OF THE INVENTION

Variable focal length wide angle lenses have lately been developed. This invention relates to a variable focal length wide angle lens that is simple in construction.

SUMMARY OF THE INVENTION

The construction of the lens according to the present invention will first be described. The entire system is divided into two main groups, a first group which comprises three lenses to form a negative lens and a second group which comprises four lenses to form a positive lens. The spacing between the groups may be varied to form a variable focal length lens. The first group comprises a first negative meniscus lens concave to the image side of the system, a second negative lens of which both surfaces are concave, and a third lens in the form of a positive lens. The second group comprises a fourth lens in the form of a positive lens, a fifth lens in the form of a positive meniscus lens, a sixth lens in the form of a thick negative lens, and a seventh lens in the form of a positive lens.

DETAILED DESCRIPTION OF THE INVENTION

Figure 1:
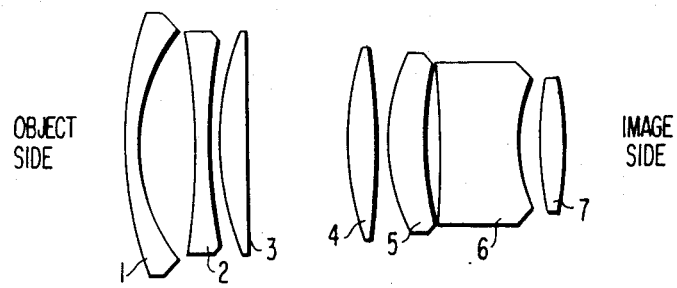
FIG. 1 illustrates a variable focal length lens system according to the present invention.
Figure 2:
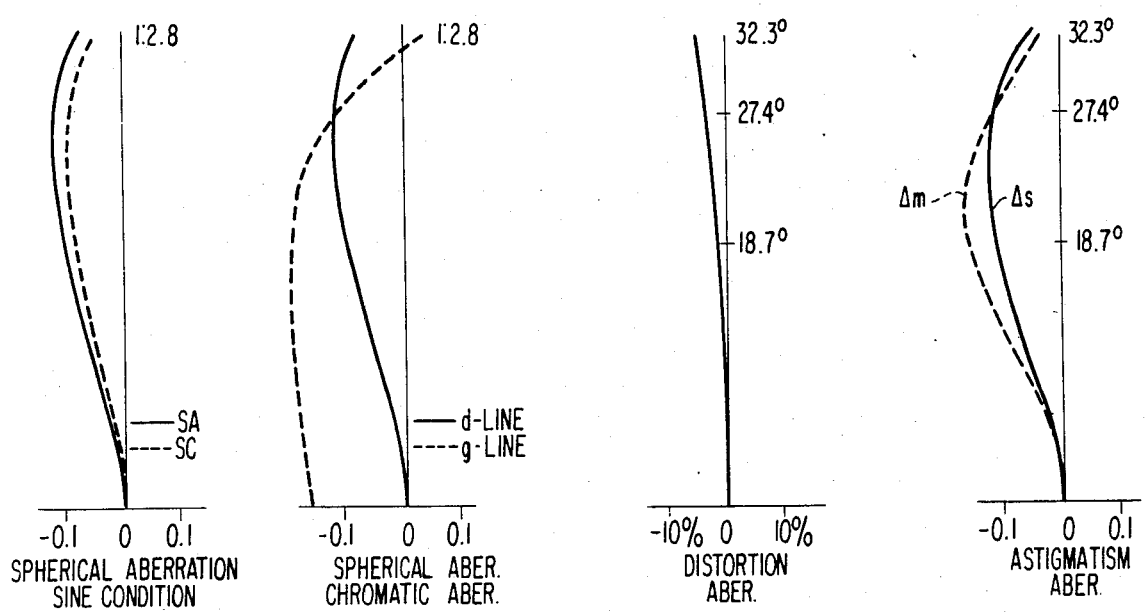
FIGS. 2, 3 and 4 are diagrams showing aberration curves, where focal length is shortest, medium, and longest, in a first embodiment of the variable focal length lens system according to the invention.
Figure 3:
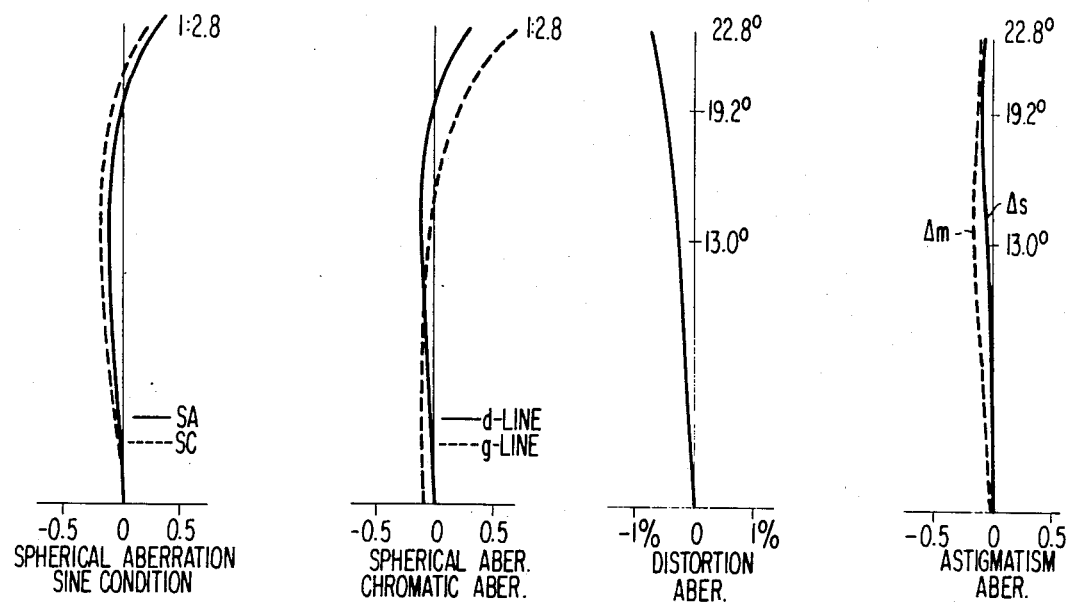
Figure 4:
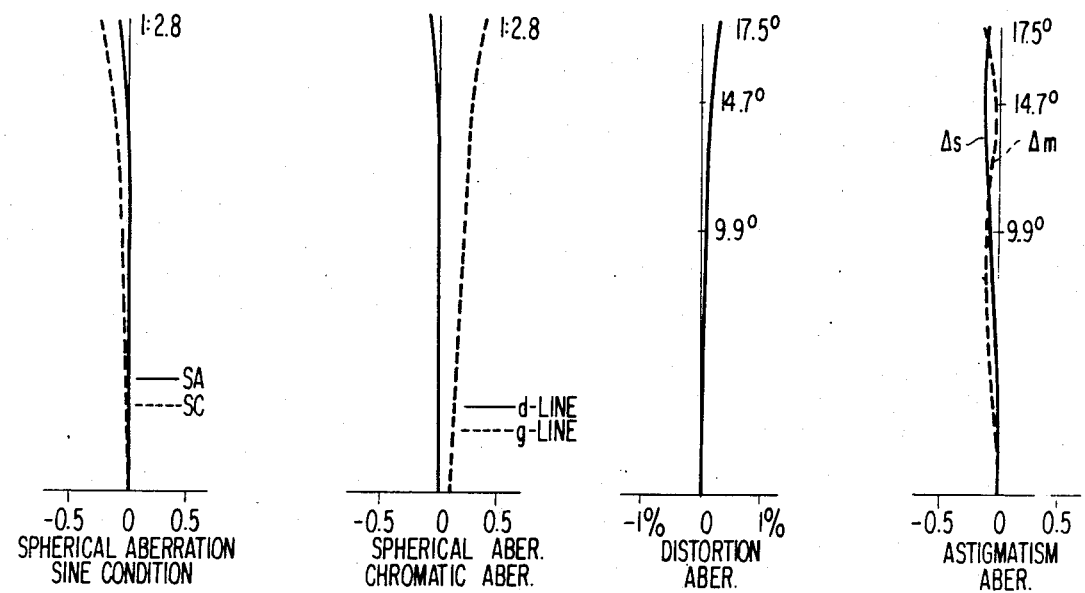

FIG. 1 shows seven lenses 1-7 which make up the invention herein. Lenses 1-3 comprise the first group and lenses 4-7 comprise the second group. Lens 1 is nearest the object side and lens 7 is nearest the image side. The reference characters used herein are as follows:

F: the residual focal length in the entire system, $F_1$: the resultant focal length of the first group of lenses (from the first lens to the third lens)

$n_i$: the refractive index of a d-line of the ith lens $i = 1$ for the lens nearest the object side of the systems, $\nu_i$: Abbe's number for the ith lens $r_j$: the radius of curvature of the jth surface, where $j = 1$ for the surface nearest the object side, $d_k$: the distance along the optical axis between the kth surface and the $(k+1)$th surface, starting from the object side of the system.

A description will now be given in reference to the following conditions, which form a feature of the present invention.

1. $\nu_1 > 40$ and $\nu_2 > 40$;
2. $0.8 |F_1| < r_4 < 1.5 |F_1|$;
3. $0.15 |F_1| < d_1 + d_2 + d_3 < 0.35 |F_1|$;
4. $1.68 < n_4,\ 1.68 < n_5,\ 1.68 < n_7$;

$$(5)\ 1.2 < \frac{d_7 + d_8 + d_9 + d_{10} + d_{11} + d_{12} + d_{13}}{d_1 + d_2 + d_3 + d_4 + d_5} < 2.2 .$$

Since lenses in the first group are compounded to form a negative lens, it is natural that the power of the negative lens in the first group is great. In order to cover light at a wide angle and particularly to eliminate chromatic aberration, it is necessary for the dispersion characteristic of the negative lens to be as small as possible.

Condition (1)

This condition is provided to satisfy the requirement as described above. If $\nu_1$, $\nu_2$ is smaller than 40, correction must be made by the use of a third lens having a $\nu$-value as small as possible. This not only worsens the chromatic aberration but creates considerable difficulty in selection of the glass material for the lens. On the other hand, if correction is made by increasing the power of the negative lens including the first and second lenses, the third lens is compelled to increase its burden thereby increasing the number of lenses, which is not desirable.

Condition (2)

This condition is concerned with the refractive power at the fourth surface and represents a balance of the negative power in the first group. That is, if the negative power of the first lens is increased, it tends to adversely affect the light higher in incidence level to form a residual flare. In order to properly correct coma aberration irrespective of the degree of the covering angle to some extent, such correction is preferably made at the fourth surface. If such correction is made at the third surface, the correcting condition is greatly influenced by the difference in incident angle, and hence, the fourth surface is preferred. If $r_4$ is smaller than $0.8\ |F_1|$, there is the possibility that excessive correction is made even if the adequate fourth surface is used as described above, and hence, it is not desirable. On the other hand, if $r_4$ is greater than $1.5\ F_1|$, there is the possibility that correction is not made as desired, and hence, it is not suitable.

Condition (3)

This condition is provided to determine the size of negative lens in the first. If $d_1 + d_2 + d_3$ is greater than $0.35\ |F_1|$, the whole structure tends to become too large. Particularly, inasmuch as the first group is preferably movable, the first group should not be too large. Further, the balance between the aberration produced at $r_2$, $r_3$ and the aberration produced at $r_5$ tends to be lost, and hence, it is desirable that the spacing not be too wide. If $d_1 + d_2 + d_3$ is smaller than $0.15\ |F_1|$, the curvature of $r_2$, $r_3$ is compelled to be reduced, and as a result, there is a greater possibility of imposing the burden on $r_4$ in condition (2), which is not desirable.

Condition (4)

This condition is provided to eliminate an increase in a quantity of aberration in the second group and to provide a simple construction. That is, refractive indexes may be set more than 1.68 to thereby decrease the burden to the curvature and to dispense with an increase in the number of lenses. The Petzval associated with selection of glass material in the first group could be prevented from being decreased so that $n_4$, $n_5$, $n_7$ may satisfy the condition (4).

Condition (5)

This condition is provided to prevent an increase in lens diameter in association with the condition (3). First, this serves to prevent a decrease in the Petzval sum by decreasing $d_7 + d_8 + d_9 + d_{10} + d_{11} + d_{12} + d_{13}$, and corrects aberration of light relatively higher in incident level at the front portion of the second group and aberration of light relatively lower in incident level at the rear portion of the second group. The overall length of the first group needs to be arranged smaller than a certain dimension for the purpose of reducing in dimension properly provide a decrease in the Petzval sum and a correction of aberration on the assumption that the first group is in a favorable form, thus resulting in difficulty also in correcting aberration.

Examples are given as follows:

Example 1

$F = 36 - 68.5$      $F_1 = -72.18$

| Lens | Radius of Curvature r | | Lens Thickness or Distance d | | Refractive Index n | Abbe's No. $\nu$ |
|---|---|---|---|---|---|---|
| $L_1$ | $r_1 =$ | 61.498 | $d_1 =$ | 1.98 | $n_1 = 1.81600$ | $\nu_1 = 46.8$ |
| | $r_2 =$ | 28.292 | | | | |
| | $r_2 =$ | 28.292 | $d_2 =$ | 10.19 | | |
| $L_2$ | $r_3 =$ | −115.896 | $d_3 =$ | 1.4 | $n_2 = 1.69680$ | $\nu_2 = 56.5$ |
| | $r_4 =$ | 77.925 | $d_4 =$ | 3.3 | | |
| $L_3$ | $r_5 =$ | 54.580 | $d_5 =$ | 5.01 | $n_3 = 1.77551$ | $\nu_3 = 37.8$ |
| | $r_6 =$ | −1879.350 | $d_6 =$ | 45.989 | −0.782 | |
| $L_4$ | $r_7 =$ | 54.200 | $d_7 =$ | 4.99 | $n_4 = 1.69680$ | $\nu_4 = 56.5$ |
| | $r_8 =$ | −159.222 | $d_8 =$ | 2.00 | | |
| $L_5$ | $r_9 =$ | 35.335 | $d_9 =$ | 6.49 | $n_5 = 1.81600$ | $\nu_5 = 46.8$ |
| | $r_{10} =$ | 81.154 | $d_{10} =$ | 2.60 | | |
| $L_6$ | $r_{11} =$ | −131.435 | $d_{11} =$ | 13.24 | $n_6 = 1.80518$ | $\nu_6 = 25.4$ |
| | $r_{12} =$ | 26.491 | $d_{12} =$ | 4.19 | | |
| $L_7$ | $r_{13} =$ | 99.329 | $d_{13} =$ | 3.80 | $n_7 = 1.75700$ | $\nu_7 = 47.9$ |
| | $r_{14} =$ | −48.129 | | | | |

Example 2

$F = 36 - 68.5$      $F_1 = -73.78$

| Lens | Radius of Curvature r | | Lens Thickness or Distance d | | Refractive Index n | Abbe's No. $\nu$ |
|---|---|---|---|---|---|---|
| $L_1$ | $r_1 =$ | 71.093 | $d_1 =$ | 1.98 | $n_1 = 1.75700$ | $\nu_1 = 47.9$ |
| | $r_2 =$ | 28.420 | $d_2 =$ | 9.85 | | |
| $L_2$ | $r_3 =$ | −119.378 | $d_3 =$ | 1.40 | $n_2 = 1.69350$ | $\nu_2 = 50.8$ |
| | $r_4 =$ | 79.402 | $d_4 =$ | 3.21 | | |
| $L_3$ | $r_5\, 32$ | 54.563 | $d_5 =$ | 4.99 | $n_3 = 1.77551$ | $\nu_3 = 37.8$ |
| | $r_6 =$ | −1111.494 | $d_6 =$ | 47.085 | −0.784 | |
| $L_4$ | $r_7 =$ | 52.129 | $d_7 =$ | 5.0 | $n_4 = 1.72600$ | $\nu_4 = 53.6$ |
| | $r_8 =$ | −187.526 | $d_8 =$ | 2.0 | | |
| $L_5$ | $r_9 =$ | 35.850 | $d_9 =$ | 6.41 | $n_5 = 1.79500$ | $\nu_5 = 45.2$ |
| | $r_{10} =$ | 83.058 | $d_{10} =$ | 2.59 | | |
| $L_6$ | $r_{11} =$ | −122.606 | $d_{11} =$ | 13.33 | $n_6 = 1.80518$ | $\nu_6 = 25.4$ |
| | $r_{12} =$ | 26.523 | $d_{12} =$ | 3.78 | | |
| $L_7$ | $r_{13} =$ | 101.957 | $d_{13} =$ | 3.80 | $n_7 = 1.75700$ | $\nu_7 = 47.9$ |
| | $r_{14} =$ | −47.120 | | | | | the whole structure with respect to $d_7 + d_8 + d_9 + d_{10} + d_{11} + d_{12} + d_{13}$ as mentioned above. In the condition (5), if $$\frac{d_7 + d_8 + d_9 + d_{10} + d_{11} + d_{12} + d_{13}}{d_1 + d_2 + d_3 + d_4 + d_5}$$

is smaller than 1.2, the denominator would be too great assuming the numerator is made small as previously mentioned. Therefore, the first group would become large, thus not satisfying the object. On the other hand, if the above quantity is greater than 2.2, there is the possibility that the lens diameter is increased in order to All linear dimensions given above are in millimeters.

What is claimed is:

1. A highly efficient variable focal length lens system composed of seven lenses divided in two groups, the first group nearest the object consisting of three lenses forming a negative lens and the second group nearest the image consisting of the remaining four lenses and forming a positive lens, said first group of said lenses including in succession in the direction from the object to the image a first lens L1 in the form of a negative meniscus lens concave to the image side of said lens system, a second negative lens L2 of which both surfaces are concave, and a third lens L3 in the form of a positive double convex lens with the more convex surface directed toward the object, said second group of said lenses including in succession in the direction from the object to the image a fourth lens L4 in the form of a positive double convex lens, a fifth lens L5 in the form of a positive meniscus lens concave to the image, a sixth lens L6 in the form of a thick negative lens, and a seventh lens L7 in the form of a positive lens, the spacing between said first group and said second group being variable.

2. The lens system of claim 1 wherein

| Lens | Radius of Curvature r | | Lens Thickness or Distance d | | Refractive Index n | Abbe's No. $\nu$ |
|---|---|---|---|---|---|---|
| | | | $F = 36 - 68.5$ | | $F_1 = -72.18$ | |
| L$_1$ | $r_1 =$ | 61.498 | $d_1 =$ | 1.98 | $n_1 = 1.81600$ | $\nu_1 = 46.8$ |
| | $r_2 =$ | 28.292 | $d_2 =$ | 10.19 | | |
| L$_2$ | $r_3 =$ | −115.896 | $d_3 =$ | 1.4 | $n_2 = 1.69680$ | $\nu_2 = 56.5$ |
| | $r_4 =$ | 77.925 | $d_4 =$ | 3.3 | | |
| L$_3$ | $r_5 =$ | 54.580 | $d_5 =$ | 5.01 | $n_3 = 1.77551$ | $\nu_3 = 37.8$ |
| | $r_6 =$ | −1879.350 | $d_6 =$ | 45.989 −0.782 | | |
| L$_4$ | $r_7 =$ | 54.200 | $d_7 =$ | 4.99 | $n_4 = 1.69680$ | $\nu_4 = 56.5$ |
| | $r_8 =$ | −159.222 | $d_8 =$ | 2.00 | | |
| L$_5$ | $r_9 =$ | 35.335 | $d_9 =$ | 6.49 | $n_5 = 1.81600$ | $\nu_5 = 46.8$ |
| | $r_{10} =$ | 81.154 | $d_{10} =$ | 2.60 | | |
| L$_6$ | $r_{11} =$ | −131.435 | $d_{11} =$ | 13.24 | $n_6 = 1.80518$ | $\nu_6 = 25.4$ |
| | $r_{12} =$ | 26.491 | $d_{12} =$ | 4.19 | | |
| L$_7$ | $r_{13} =$ | 99.329 | $d_{13} =$ | 3.80 | $n_7 = 1.75700$ | $\nu_7 = 47.9$ |
| | $r_{14} =$ | −48.129. | | | | |

3. The lens system of claim 1 wherein

| Lens | Radius of Curvature r | | Lens Thickness or Distance d | | Refractive Index n | Abbe's No. $\nu$ |
|---|---|---|---|---|---|---|
| | | | $F = 36 - 68.5$ | | $F_1 = -73.78$ | |
| L$_1$ | $r_1 =$ | 71.093 | $d_1 =$ | 1.98 | $n_1 = 1.75700$ | $\nu_1 = 47.9$ |
| | $r_2 =$ | 28.420 | $d_2 =$ | 9.85 | | |
| L$_2$ | $r_3 =$ | −119.378 | $d_3 =$ | 1.40 | $n_2 = 1.69350$ | $\nu_2 = 50.8$ |
| | $r_4 =$ | 79.402 | $d_4 =$ | 3.21 | | |
| L$_3$ | $r_5 =$ | 54.563 | $d_5 =$ | 4.99 | $n_3 = 1.77551$ | $\nu_3 = 37.8$ |
| | $r_6 =$ | −1111.494 | $d_6 =$ | 47.085 −0.784 | | |
| L$_4$ | $r_7 =$ | 52.129 | $d_7 =$ | 5.0 | $n_4 = 1.72600$ | $\nu_4 = 53.6$ |
| | $r_8 =$ | −187.526 | $d_8 =$ | 2.0 | | |
| L$_5$ | $r_9 =$ | 35.850 | $d_9 =$ | 6.41 | $n_5 = 1.79500$ | $\nu_5 = 45.2$ |
| | $r_{10} =$ | 83.058 | $d_{10} =$ 2.59 | | | |
| L$_6$ | $r_{11} =$ | −122.606 | $d_{11} =$ | 13.33 | $n_6 = 1.80518$ | $\nu_6 = 25.4$ |
| | $r_{12} =$ | 26.523 | $d_{12} =$ | 3.78 | | |
| L$_7$ | $r_{13} =$ | 101.957 | $d_{13} =$ | 3.80 | $n_7 = 1.75700$ | $\nu_7 = 47.9$ |
| | $r_{14} =$ | −47.120 | | | | |

* * * * *